United States Patent [19]
Bond et al.

[11] 4,421,146
[45] Dec. 20, 1983

[54] QUICK-DISCONNECT SERVICE-LINE CONNECTOR AND VALVE ASSEMBLY

[75] Inventors: Curtis J. Bond, Marion; John G. Ulm, Upper Sandusky, both of Ohio

[73] Assignee: Liqui-Box Corporation, Worthington, Ohio

[21] Appl. No.: 355,530

[22] Filed: Mar. 8, 1982

Related U.S. Application Data

[63] Continuation-in-part of Ser. No. 319,580, Nov. 9, 1981.

[51] Int. Cl.³ ............................ B65B 3/04; B67C 5/37
[52] U.S. Cl. .................................... 141/349; 141/383; 251/149.1; 251/291; 251/353
[58] Field of Search ................... 251/149.1, 291, 353; 220/360; 150/8; 217/98, 99; 215/307, 311; 141/346–362, 382–388, 285–310

[56] References Cited

U.S. PATENT DOCUMENTS

| | | | |
|---|---|---|---|
| 2,597,250 | 5/1957 | Kollsman | 141/351 |
| 2,816,690 | 12/1957 | Lari | 141/351 |
| 3,334,860 | 8/1967 | Bolton . | |
| 3,464,436 | 9/1969 | Bruning . | |
| 3,871,404 | 3/1975 | Courant . | |
| 4,014,461 | 3/1977 | Harvill . | |
| 4,286,636 | 9/1981 | Credle . | |
| 4,353,488 | 10/1982 | Schneiter et al. | 222/501 |
| 4,380,310 | 4/1983 | Schneiter et al. | 222/501 |

FOREIGN PATENT DOCUMENTS

| | | | |
|---|---|---|---|
| 155098 | 2/1954 | Australia | 141/351 |
| 438454 | 12/1926 | Fed. Rep. of Germany | 141/351 |

*Primary Examiner*—Houston S. Bell, Jr.
*Attorney, Agent, or Firm*—William V. Miller

[57] ABSTRACT

A quick-disconnect service-line connector assembly for use in a beverage dispensing system or the like for connecting the service line to a single-service coupling and dispensing spout valve assembly on a flexible bag containing a liquid or semi-liquid product to be dispensed. It comprises a clamp which permits quick application to and removal from the spout of the single-service assembly and the clamp carries a guide structure for mounting a plug or nozzle body assembly for axial movement relative to the spout for insertion into the closed dispensing spout valve member carried therein for pushing it into opened position and simultaneously gripping it so that, as it is withdrawn, it moves the dispensing spout valve member again into closed position. In the nozzle body is a normally-closed flow control valve which is positively opened when the nozzle is inserted into the dispensing spout valve and which is automatically closed as it is withdrawn therefrom.

22 Claims, 11 Drawing Figures

QUICK-DISCONNECT SERVICE-LINE CONNECTOR AND VALVE ASSEMBLY

BACKGROUND OF THE INVENTION AND PRIOR ART

This application is a continuation-in-part of the copending application of Bond et al., Ser. No. 319,580, filed Nov. 9, 1981.

The present invention deals mainly with quick-disconnect service-line connector and valve assembly which is especially useful in connection with a quick-disconnect coupling and dispensing valve assembly of the type disclosed in the said copending application, Ser. No. 319,580 which is mounted on the spout of a collapsible bag of a bag-in-box package from which dispensing of liquids and semi-liquids can occur such as by various beverage syrup dispensing systems.

Various systems are in use or have been proposed for dispensing beverage syrup from a disposable package consisting of a flexible collapsible bag in a corrugated box commonly referred to as a bag-in-box dispensing package. One such system capable of use with the bag-in-box is illustrated in U.S. Pat. No, 4,014,461. The bag is provided with a fitment in the form of a spout through which filling and dispensing occurs and carried on the spout is a single-service quick-disconnect coupling and valve of the type shown specifically in U.S. Pat. No. 4,286,636 which is adapted to receive the service-line connector of the beverage dispensing system. The discardable single-service coupling is of the threaded type for receiving the complementally threaded service-line connector shown in U.S. Pat. No. 4,286,636 which is a fixed unit of the beverage dispensing system.

It is difficult and time-consuming to connect the threaded service-line connector of the prior art onto the single-service coupling of the prior art which is mounted on the exposed spout of the bag-in-box at that time. It requires the use of both hands to hold or manipulate the two parts to be coupled while they are secured together which often is inconvenient and results in fluid loss.

Example of prior art fluid couplings which do not use screw threads are shown in U.S. Pat. No. 3,334,860; 3,464,436 and 3,871,404 but these are devices which would not be suitable for mounting on the spout of a flexible bag and which do not include a discardable or single-service coupling. One reason they are not suitable for mounting on the spout is that they are of such a nature that considerable spring pressure must be overcome by axial movement of the two parts to be coupled and this not only requires the use of two hands but also might result in displacement of the spout from the box wall if one part were mounted theron. Furthermore, considerable loss of fluid would occur during the coupling action.

BRIEF DESCRIPTION OF THE INVENTION

The service-line connector assembly of this invention, as indicated, is adapted to be mounted on a single-service coupling and dispensing spout valve assembly of the type disclosed in said copending application Ser. No. 319,580 but slightly modified which, in turn, is mounted on a bag spout locked in a wall of a box. As indicated in that application, the single-sevice coupling and valve assembly includes a valve which is moved into opened position by the insertion of a cooperating tip on a body member which may be a service-line connector having a passage for fluid extending therethrough. The valve has means which grips that member, as it is withdrawn, so that the valve is moved into closed position. The service-line connector of the present invention includes such a body in the form of a nozzle-like member with the said cooperating tip. This nozzle-like member is carried by a simple spout clamping means for axial movement relative to the spout from a retracted position out of the spout to an advanced position where the tip is inserted into the spout and into the valve of the single-service coupling carried thereby. The nozzle-like body has a valve for controlling the passage extending therethrough which is axially movable relative to a seat therein but which is normally yieldingly held on its seat. Due to the simple clamping means, the service-line connector assembly can be easily slipped off and on the spout with one hand and, when on, will be free to rotate, so that a swivel joint in the service line at the connector will not be required. The normally-retracted nozzle-like body can then be advanced on the spout-clamping means to move the tip into the valve member of the single-service connector which according to this invention, is provided with valve-opening means which engages the valve in the nozzle body, and positively opens it, to allow dispensing through the single-service coupling and the service-line coupling which are now coupled together. The nozzle-like body can be retracted on its supporting clamp to withdraw its tip from the valve of the single-service coupling and simultaneously permit automatic seating of the valve which it carries to prevent backflow of product from the service line. With the simple spout clamping means for mounting the service line connector assembly on the spout, during and after the connection, there is no undue axial force on the spout which might cause displacement of it from the box wall. Furthermore, use of the service-line connector with the associated single-service coupling produces a minimum of product residue and resulting waste. Also, the service-line connector can be connected in a manifold system and the valve thereof can be opened or allowed to close without having any effect on similar units connected in the system. The service-line connector is composed of a minimum number of parts so it will be less costly to mold and assemble and the parts are so designed relatively that they can be disassembled easily for cleaning.

BRIEF DESCRIPTION OF THE DRAWINGS

The best mode contemplated in carrying out this invention is illustrated in the accompanying drawings in which.

DETAILED DESCRIPTION OF THE INVENTION

With reference to the drawings, the service-line connector assembly of this invention is designated generally by the numeral 70 and the single-service coupling and valve assembly is shown (FIGS. 7 to 10) as comprising the two main parts, namely, the spout fitment 21, attached to a flexible plastic bag B, and a dispensing spout valve member 22 which telescopes therein. The same reference numerals will be used in this description as in the copending application Ser. No. 319,580 to refer to corresponding parts. In this instance the dispensing spout valve member 22 is provided with an axially-outwardly extending valve-opening projection 22a which is formed centrally on transverse wall 36 thereof.

The service-line connector assembly 70 of this invention includes the substantially tubular plug body 71 (FIGS. 1 to 6) which, as indicated in the copending application, has a passsageway 72 extending therethrough and through which the product to be dispensed is adapted to flow. The body 71 with the tip 73 is as indicated, of nozzle-like form. The service-line connection to this passageway may be made through two diametrically opposed threaded socket fittings 81. These make it possible to connect several of the bags in tandem in the dispensing system. The plug body 71 is preferably of nylon or other suitable plastic and as described in said copending application, the leading end or tip 73 is of hemispherical form and merges with a cylindrical sealing surface 74 which has an O-ring 75 mounted in an annular groove formed therein. Also, axially outwardly of the surface 74 is the annular contact shoulder 76a and just outwardly of that is the annular groove 77a adapted to receive the gripper lugs 45a (FIG. 7) of the valve member 22.

As will later appear, the nozzle-like body 71 is carried for axial reciprocation on a spout clamp indicated generally by the numeral 100, which can be readily clamped to or removed from the spout fitment 21.

Figure 1:
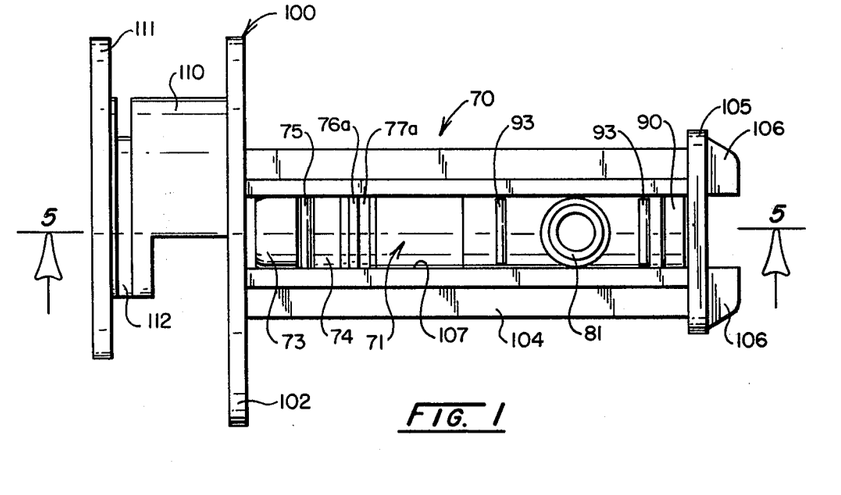
FIG. 1 is a side elevational view of the service-line connector assembly of this invention.
Figure 2:
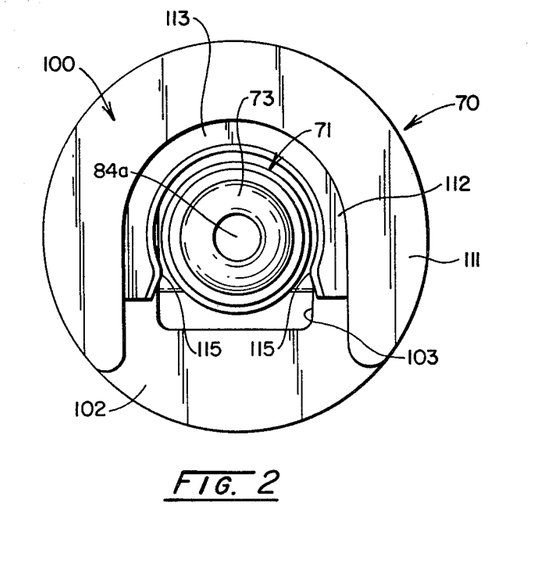
FIG. 2 is an elevational view of the inner end of the connector assembly.
Figure 3:
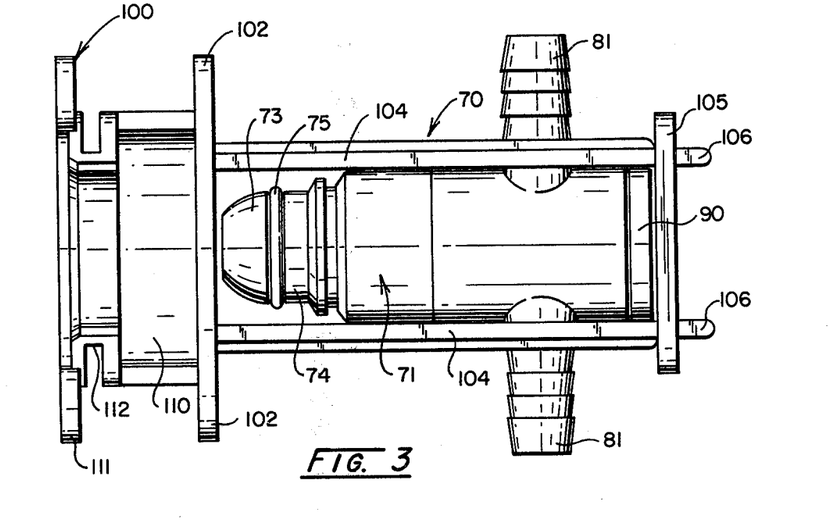
FIG. 3 is a top view of the service-line connector assembly.
Figure 4:
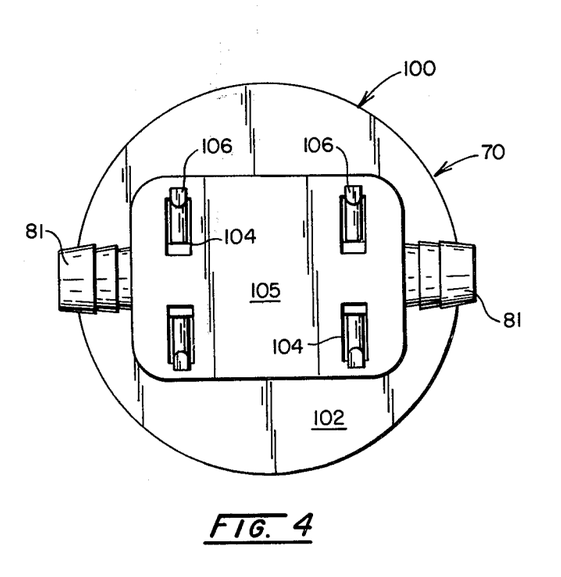
FIG. 4 is an elevational view of the outer end of the connector assembly.
Figure 5:
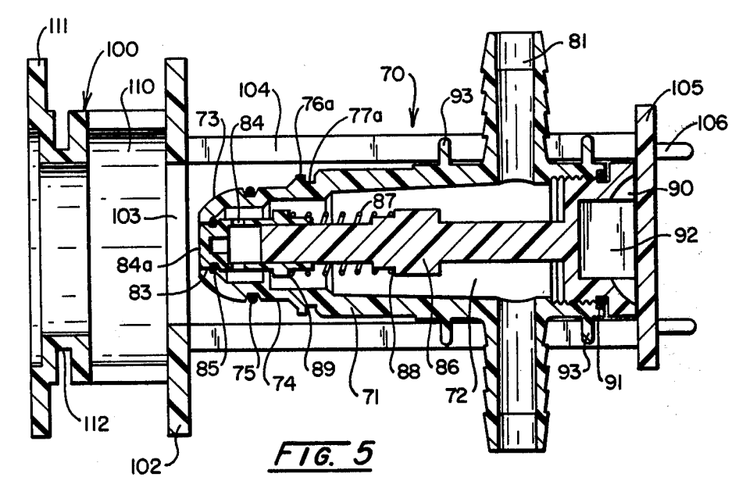
FIG. 5 is an axial sectional view taken along line 5—5 of FIG. 1 showing the valve of the service-line connector assembly seated in closed position in the nozzle body of the connector which is in retracted position on the spout clamp.

As indicated, the body 71 is of nozzle-like form and is hollow to provide the axially-extending passageway 72 and this passageway communicates with the outlet fittings 81. An inlet opening 83 is provided at the tip 73 which is normally closed by an axially slideable cylindrical valve 84 which carries an O-ring 85 that normally seats on a seat just inside the opening 83. The O-ring is on a reduced extension of valve 84 which is closed at its flat outer end 84a and fits into inlet 83. This valve is mounted for axial sliding movement on the end of a stem 86 which projects toward the valve seat. Surrounding this stem is a compression spring 87 which has its one end engaging an annular shoulder 88 thereon and its other end engaging an annular shoulder 89 on the valve 84 to hold it seated and, at this time, the flat seated end of the closed valve will be spaced from the end of the stem (FIG. 5).

The stem 82 is integral with a flanged plug 90 which is threaded into the open end of the body 71. An O-ring 91 is provided between these members at this joint for a fluid-tight seal. The plug 90 is provided with a tool-receiving socket 92 for ease of removal. At axially spaced positions on the body 71, it is provided with pairs of diametrically-opposed guide lugs 93 for cooperation with a guide structure on the spout clamp 100.

As indicated, according to this invention, for quickly mounting the service-line connector on the spout and removing it therefrom, the spout clamp indicated generally at 100 is provided and this clamp carries a guide assembly, which slidably receives lugs 93, for mounting the plug body 71, and the valve parts assembled therein, for axial movement. The clamp 100 includes an outer collar or annular flange 102 which has a large central opening 103 (FIGS. 2 and 5 to 8) through which concentrically disposed plug body 71 can axially pas. Integral with the collar 102, are outwardly-extending flexible guide strips 104 of angular cross-section which are perpendicular to the transverse plane of the collar 102, four being shown. The outer ends of these strips pass through two pairs of aligned transverse slots in a flat clip plate 105 and are provided with shouldered enlargements 106 at their outer ends for snapping behind the clip, after insertion, for locking them in properly-spaced parallel relationship. The projecting ends of the strips are bevelled to facilitate insertion in the slots. In this spaced relationship, the guide strips 104 provide two opposed guide channels 107 for receiving the guide lugs 93 on nozzle body 71. Fittings 81 will project outwardly through the same channels. Thus, the plug body assembly 71 can be moved axially on the clamp and guide assembly 100 to insert it into the spout 21 and the dispensing spout valve 22 in the spout and to withdraw it therefrom, as will be more clearly understood later.

The collar 102 of clamp 100 has an integral flange 110 of yoke form of sufficient width to pass radially over the spout 21. This flange is connected to a flat box wall engaging flange 111 of yoke form by a spout-engaging channel flange section 112 which is of U-form in axial cross-section. The flange 111 is of yoke form and also of sufficient width to slip radially over the spout 21 and forms a flange-receiving recess 113 where it joins section 112 for receiving spout flange 25. However, the flange section 112 is of special formation so that it must be forced radially over the spout 21 and will be retained in position until sufficient radial force in a reverse direction is applied. This force is relatively small since the spout 21 is flexible and will contract sufficiently. Thus, the section 112 (FIGS. 2 and 9) is of arcuate form of a radius complemental to that of the radius of the spout 21 and of an extent slightly greater than a semi-circle so that it will have the pair of locking extremities 115 which project toward each other and are spaced apart slightly less than the diameter of the spout body so they will snap over the body of the spout 21 and lock the clamp thereon until it is positively removed. Thus, the clamp can rotate on the spout but will not be displaced therefrom normally axially or radially.

As previously indicated, the plug body assembly 71 may be of suitable plastic, if desired, and similarly the clamp 100 and guide assembly thereon may be of plastic. The parts can be disassembled and assembled for cleaning without special hand tools. By pressing the locking ends 106 of the guides 104 inwardly, the clip 105 can be removed and then the plug body assembly 71 can be removed and disassembled. It can be disassembled by merely unscrewing the plug 90 from the body 71.

Figure 6:
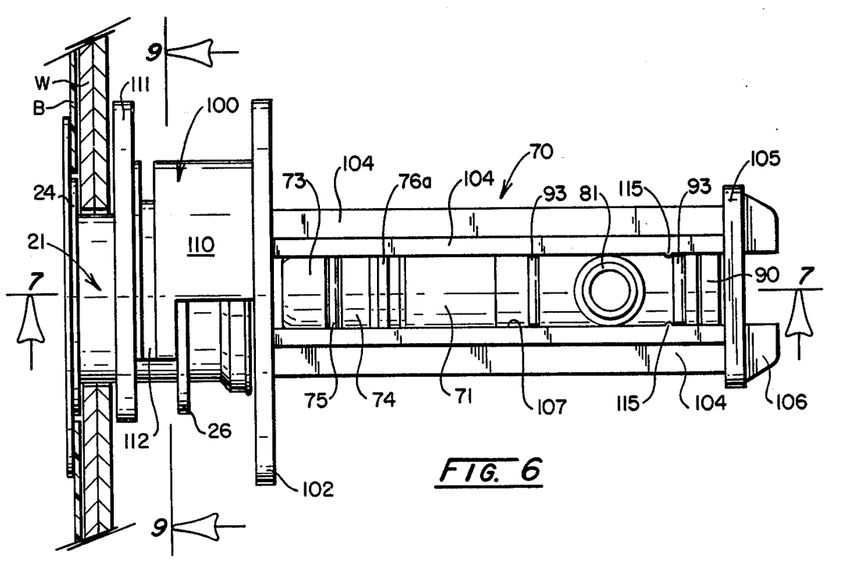
FIG. 6 is a side elevational view showing the service-line connector assembly clamped on the bag spout with the nozzle body thereof retracted on the spout clamp and the service-line connector valve in closed position with the dispensing spout valve of the single-service coupling and valve assembly closed.
Figure 7:
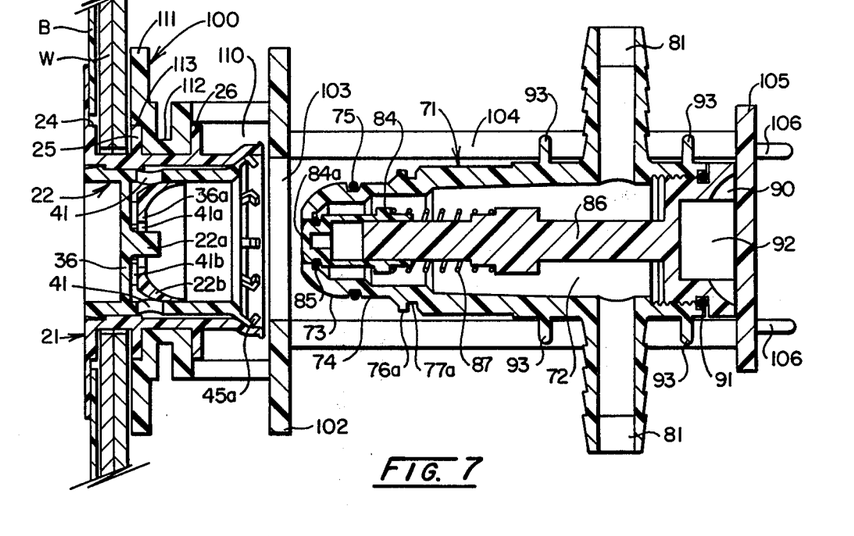
FIG. 7 is an axial sectional view taken on line 7—7 of FIG. 6.

In mounting the service-line connector 70 on the spout 21, assuming that the spout with the dispensing spout valve 22 therein has been locked in the wall W of the box with its axis substantially horizontal and that the valve 22 is in closed position, it is first mounted on the spout as shown in FIGS. 6 and 7, by moving the clamp 100 downwardly over the spout. As explained in said copending application, wall W is between spout flanges 24 and 25. The spout-engaging flange section 112 will fit frictionally between the axially-spaced shoulders formed by flanges 25 and 26 of the spout after the clamp 100 is forced radially or transversely thereon and the periphery of the spout will be frictionally engaged by the complementally-curved flange section 112. The inner yoke flange 111 will contact the adjacent face of the box wall W and it will be noted that since the recess 113 is provided at the curved part of the yoke flange 111, it will receive flush, the spout flange 25. The curved part of the yoke flange 110 is of a curvature complemental to that of the spout flange 26 and will frictionally engage it. At this time, and during positioning of the connector and valve assembly 70 on the spout 21, the valve 84 thereof will be held in closed position by spring 87, thus preventing accidental loss of product from the service line. The plug or nozzle assembly 71, as shown, will be at its outermost or retracted position (FIGS. 5 to 7) and will not yet be in the spout 21, being held in that position by small shoulders 115 on guide strips 104 at their outer ends and which are ahead of the outermost guide lugs 93. The dispensing spout valve 22 will be in closed position within the spout 21 (FIG. 7).

If it is now desired to move the plug or nozzle body 71 into the spout 21 to open the dispensing spout valve 22, as described in said copending application, it is moved axially inwardly on the clamp-carried guide strips 104 by applying axial inward force with the fingers on fittings 81 to cause the guide lugs 93 to snap past the stop shoulders 115, the strips having enough resiliency to permit this. As indicated, according to this invention, the valve 22 is provided with the central outward projection 22a and inserting the body 71 into the coupling 21 causes the tip 73 to enter the valve member 22 and move it inwardly into the spout 21 until the dispensing outlets 41 are exposed. At the same time, the end of valve-opening axial projection 22a contacts the flat end 84a of service line flow control valve 84 and moves it axially-outwardly to open the inlet 83 in the nozzle tip 73, to the passage 72, to allow dispensing therethrough. Dispensing can be interrupted merely by retracting the nozzle 71 on the guide strips 104 to the position shown in FIG. 7. This allows spring 87 to automatically seat the valve 84 and close the inlet 83 to passage 72. As pointed out specifically in the copending application, this also causes grippers 45a to grip the member 71 and pull the valve 22 axially outwardly to closed position. Thus, retracting member 71 results in closing of both the dispensing spout valve 22 and the service line connector flow control valve 84. After, retraction of the nozzle member 71 on the clamp, the entire service-line connector assembly 70 may be removed by slipping the clamp 100 radially upwardly off the spout 21.

Figure 8:
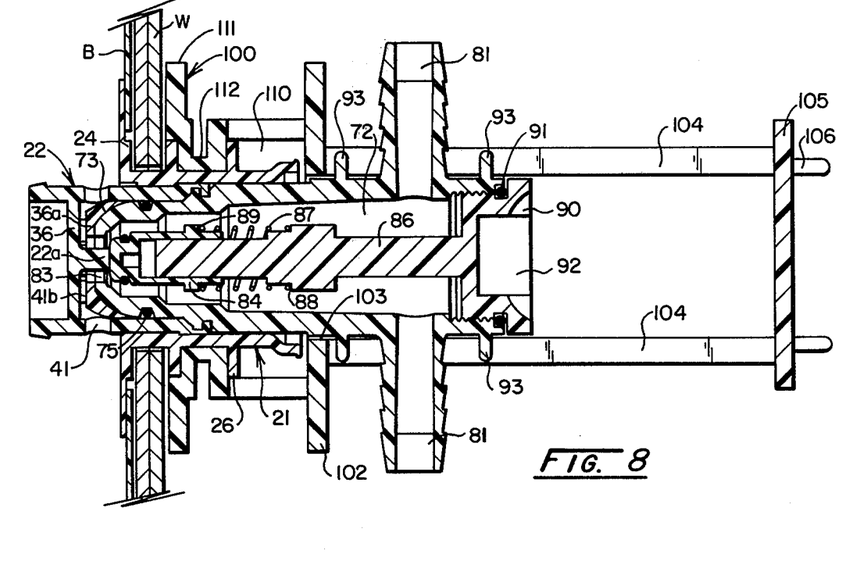
FIG. 8 is a similar view but showing the nozzle body inserted to open both of the valves to allow dispensing through both couplings.
Figures 9, 10, 10A:
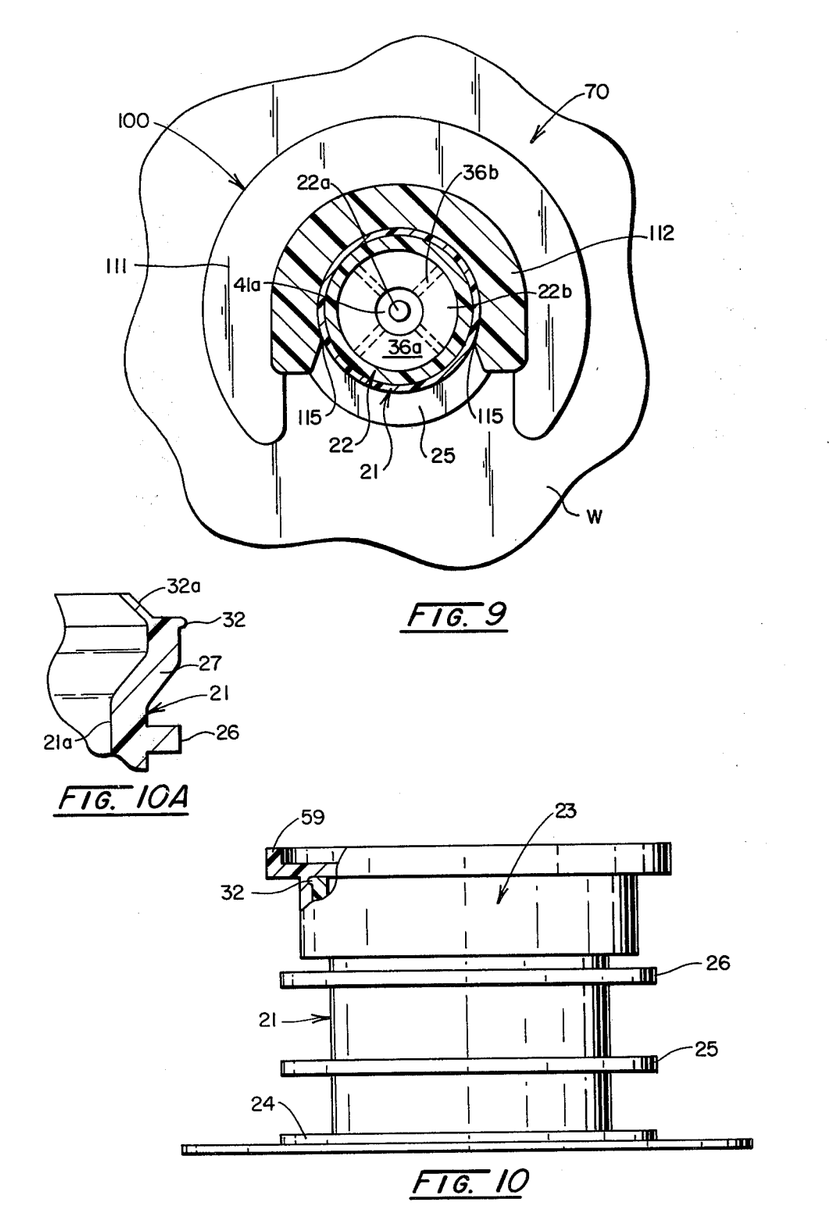
FIG. 9 is a transverse sectional view taken along line 9—9 of FIG. 6.
FIG. 10 is a side elevational view, partly cut away, of the single-service coupling and valve assembly with a dust cap for protecting it during shipping and storage.
FIG. 10A is a fragmental sectional view showing a slight modification of the spout lip.

When dispensing some products, it may be desirable to provide a filler collar 22b around the valve-opening projection 22a. As shown in FIGS. 7 to 9, this collar is of concave form complemental to the convex form of the nozzle tip 73. It has a central opening 41a which fits over projection 22a and has a flat inner wall 36a. This flat inner wall has ribs on its surface engaging flat wall 42 of valve 22 to provide passages 41b between these walls for flow from dispensing outlets 41 of valve 22 to inlet 83 of the nozzle 71. This collar will be supplied as part of the spout valve 22, when required, and will merely serve to fill space and prevent accumulation of product as the member 71 is withdrawn from valve 22.

In FIG. 10, the single-service coupling and valve assembly of the copending application is illustrated as being provided with a dust cap 23 for protection during shipping and storage, the dispensing spout valve being in closed position within the spout 21 which has cap-retaining lip 32 at its outer end. The radially-extending peripheral flange referred to in the previous application carries the upstanding flange 59 which is to prevent the clamp 100 from being slipped over the top of the dust cap and the flange 26 so as to ensure that it will be applied between the flanges 25 and 26 which is proper. The spacing between flanges 25 and 26 is less than the spacing between yoke flanges 102 and 111 of the clamp but that between flange 26 and the outer edge of flange 59 is greater to prevent the clamp from slipping thereover, as indicated in this figure.

FIG. 10a shows a modification of the spout 21 by providing on its lip an arrangement to catch and retain a small amount of product residue when the nozzle 71 is disengaged from the dispensing spout valve 22 of the single-service coupling assembly. In this instance an additional annular flange 32a is provided at the inner edge of the flared spout lip 27 and extends axially and inwardly at an angle but terminates within the annular inner surface 21a of the spout body. When nozzle tip 73 is withdrawn from spout 21 and moves valve member 22 to its outermost position this will tend to retain any small amount of product which would otherwise drip from flared spout end 27.

With the above-described service-line connector, the simple clamping means makes it possible to slip it onto and off the spout by the application of slight radial pressure to cause the locking projections to pass the diameter of the spout. This can be done with one hand. When the connector is once mounted on the spout, it will be effectively retained thereon and will be free to rotate but prevented from axial movement on the spout by interfitting parts of the spout and clamping means. Excessive axial pressure which might displace the spout on the box wall is not required to connect the service-line connector to the spout. No fluid will be lost during coupling and uncoupling of the service-line connector and the single-service connector since both valves will normally be in closed positions. The normally-closed service-line flow control valve will be positively opened for dispensing when the nozzle is inserted in the normally-closed spout valve and will function automatically to close when dispensing stops to prevent backflow of product. The entire assembly is so designed that a minimum of residue will remain in the service line connector and single-service assemblies. Withdrawal of the plug body from the dispensing spout valve automatically closes the spout valve due to the gripping action between the plug body and valve. The service-line connector assembly can be made from material which can be readily sterilized and can be quickly disassembled and assembled for cleaning.

Having thus described this invention what is claimed is:

1. A service-line connector for connecting the service-line of a fluid dispensing system to a spout on a container or the like comprising means for removably mounting it on the spout, said connector including a nozzle body having a fluid passageway therethrough with a service-line connection and an inlet leading thereinto, a normally-closed valve for controlling flow into and out of said inlet, guide means extending from said mounting means for supporting the body for axial movement to insert it into and withdraw it from the spout and means for positively opening said valve as the nozzle body is inserted into the spout, said mounting means being of yoke form and being adapted to slip transversely onto the spout to interfit therewith to prevent axial movement of the mounting means relative to the spout in either direction during insertion of the nozzle body into or withdrawal of it from the spout.

2. A service-line connector according to claim 1 in which said yoke mounting means includes clamping means fitting around the spout and rotatable thereon.

3. A service-line connector according to claim 2 in which the spout has a body of cylindrical tubular form and the clamping means comprises an arcuate spout-engaging flange adapted to slip radially over the spout body which is of a curvature complemental to that of the spout body and is greater than a semi-circle but less that a full circle.

4. A service-line connector according to claim 3 in which said spout body has a pair of axially-spaced inner and outer radially-extending peripheral annular flanges with which said yoke mounting means interfits, said clamping means having an inner yoke-shaped flange with an arcuate portion complemental to the curvature of the inner flange for engaging that flange, an outer yoke-shaped flange with an arcuate portion complemental to the curvature of the outer flange for engaging that flange, said spout-engaging flange being between and connecting the two yoke-shaped flanges and fitting between the two spout flanges when it is slipped radially on the spout body to engage said flanges and prevent axial movement and to engage the spout body for rotation but to prevent accidental radial displacement.

5. A service-line connector according to claim 4 in which said inner flange of the clamping means has a flat inner face with an arcuate recess in it for receiving said inner spout flange.

6. A service-line connector according to claim 5 including an outer collar outwardly of said outer yoke-shaped flange to which it is fixed, said collar having a central opening through which said connector nozzle body can pass, said guide means comprising guide members fixed on said collar and extending outwardly therefrom to form guideways, and guides on said connector body extending into said guideways.

7. A service-line connector according to claim 6 in which said guide members are flexible and attached at their inner ends to said collar and clip means for normally connecting the outer ends of said guide members in spaced relationship to provide said guideways.

8. A service-line connector according to claim 7 including retaining shoulders along said guide members to releasably engage said guides to normally hold said nozzle body in a retracted position on said guide member where it is withdrawn from the spout.

9. A service-line connector according to claim 1 in which the inlet control valve comprises a member axially movable relative to the inlet, and a spring normally positioning the valve to close the inlet, said means for opening the outlet comprising means carried by the spout for engaging the valve to move it to a position to open the inlet.

10. A service-line connector and a cooperating coupling and valve assembly for a container which includes a spout having axially-spaced shoulders on its exterior and a dispensing valve member movable therein between normally-closed and opened positions, said service-line connector including means for removably mounting it on the spout, and a nozzle body having a fluid passageway therethrough with a service-line connection and an inlet leading thereinto, a normally-closed flow control valve for controlling flow through said inlet, in either direction, and guide means extending from said mounting means for supporting the nozzle body for axial movement to insert it into the spout to engage the dispensing spout valve member and move it into opened dispensing position, means carried by the dispensing spout valve member to positively open the normally-closed flow control valve in the nozzle body as it is inserted into the spout, and gripping means between the nozzle body and the dispensing spout valve member actuated by insertion of the body into the spout so that upon withdrawal of the body from the spout the dispensing spout valve member will be moved positively into closed position within the spout, said mounting means comprising a yoke adapted to slip radially onto the spout to interfit with said axially-spaced shoulders thereon to prevent axial movement of the mounting means relative to the spout in either direction during insertion of the nozzle body into or withdrawal of it from the spout.

11. The combination of claim 10 in which the spout has a body of cylindrical tubular form and the dispensing spout valve member is of cylindrical tubular form and is mounted for axial movement in the spout body, said dispensing spout valve member having a socket for receiving a complemental tip on said nozzle body.

12. The combination of claim 11 in which the tip of the nozzle body has the inlet formed therein with an associated valve seat, said control valve in the nozzle body having a forward end which is normally held on said seat by spring means, said means for positively opening the control valve in the nozzle body comprising an outward projection on the dispensing valve member for engaging the forward end of said control valve as the nozzle tip is inserted in said dispensing spout.

13. The combination of claim 12 in which the control valve is of tubular form with its forward end closed and is supported for axial reciprocation on a central stem within the nozzle body, said spring surrounding the stem and being disposed between shoulders on the stem and tubular valve, said stem being carried by a plug threaded into the rear end of the nozzle body.

14. The combination of claim 12 in which a filler collar is inserted in said dispensing valve member socket and dispensing passages are provided through said collar.

15. The combination of claim 12 in which said means for removably mounting the service line connector on the spout comprises clamping means fitting around the spout and rotatable thereon.

16. The combination of claim 15 in which the clamping means comprises an arcuate spout-engaging flange of yoke form adapted to slip radially over the spout body which is of a curvature complemental to that of the spout body and is greater than a semi-circle but less than a full circle.

17. The combination of claim 16 in which said spout body shoulders are a pair of axially-spaced inner and outer radially-extending peripheral annular flanges, said clamping means having an inner yoke shaped flange with an arcuate portion complemental to the curvature of the inner flange, an outer yoke-shaped flange with an arcuate portion complemental to the curvature of the outer flange for engaging that flange, said spout-engaging flange being between and connecting the two yoke-shaped flanges and fitting between the two spout flanges when it is slipped radially on the spout body to engage said flanges and prevent axial movement and to engage the spout body for rotation but to prevent accidental radial displacement.

18. The combination of claim 17 in which said yoke-shaped inner flange of the clamping means has a flat inner face with an arcuate recess in it for receiving said inner spout flange.

19. The combination of claim 18 including an outer collar outwardly of said outer yoke-shaped flange to which it is fixed, said collar having a central opening through which said connector body can pass, said guide means comprising guide members fixed on said collar and extending outwardly therefrom to form guideways and guides on said connector body extending into said guideways.

20. The combination of claim 19 in which said guide members are flexible and are attached at their inner ends to said collar, and clip means for normally connecting the outer ends of said guide members in spaced relationship to provide said guideways.

21. The combination of claim 18 in which the spout body has an additional flange spaced axially inwardly of the first flange for receiving a box wall therebetween.

22. The combination of claim 11 in which the spout has a body with a flared lip, and an axially product-collecting annular flange extending axially and inwardly from said lip but terminating within the surface of said body.

* * * * *

REEXAMINATION CERTIFICATE (3440th)
United States Patent [19]
Bond et al.

[11] B1 4,421,146
[45] Certificate Issued Feb. 17, 1998

[54] QUICK-DISCONNECT SERVICE-LINE CONNECTOR AND VALVE ASSEMBLY

[75] Inventors: Curtis J. Bond, Marion; John G. Ulm, Upper Sandusky, both of Ohio

[73] Assignee: Liqui-Box Corporation, Worthington, Ohio

Reexamination Request:
No. 90/004,661, Jun. 9, 1997

Reexamination Certificate for:
Patent No.: 4,421,146
Issued: Dec. 20, 1983
Appl. No.: 355,530
Filed: Mar. 8, 1982

Related U.S. Application Data

[63] Continuation-in-part of Ser. No. 319,580, Nov. 9, 1981.
[51] Int. Cl.[6] ................. B65B 3/04; B67C 5/37
[52] U.S. Cl. .......... 141/349; 141/383; 251/149.1; 251/291; 251/353
[58] Field of Search ............. 141/346–362, 141/382–388, 285–310; 251/149.1, 291, 353, 148; 137/614.03, 614.04, 614.06; 285/325; 222/501, 105; 220/360; 215/307, 311; 217/98, 99; 150/8; 604/405, 416

[56] References Cited

U.S. PATENT DOCUMENTS

| | | | |
|---|---|---|---|
| 1,611,239 | 12/1926 | Sanford | 141/347 |
| 1,828,934 | 10/1931 | Kramer | 141/349 |
| 2,168,396 | 8/1939 | Davis | 141/346 |
| 3,768,501 | 10/1973 | Elson et al. | 137/231 |
| 3,871,422 | 3/1975 | Elson et al. | 141/10 |
| 4,310,071 | 1/1982 | Plow | 184/88 R |
| 4,375,864 | 3/1983 | Savage | 222/81 |

*Primary Examiner*—Steven O. Douglas

[57] ABSTRACT

A quick-disconnect service-line connector assembly for use in a beverage dispensing system or the like for connecting the service line to a single-service coupling and dispensing spout valve assembly on a flexible bag containing a liquid or semi-liquid product to be dispensed. It comprises a clamp which permits quick application to and removal from the spout of the single-service assembly and the clamp carries a guide structure for mounting a plug or nozzle body assembly for axial movement relative to the spout for insertion into the closed dispensing spout valve member carried therein for pushing it into opened position and simultaneously gripping it so that, as it is withdrawn, it moves the dispensing spout valve member again into closed position. In the nozzle body is a normally-closed flow control valve which is positively opened when the nozzle is inserted into the dispensing spout valve and which is automatically closed as it is withdrawn therefrom.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–22 is confirmed.

* * * * *